United States Patent
Pan et al.

(10) Patent No.: US 11,761,749 B2
(45) Date of Patent: Sep. 19, 2023

(54) STRAIN MAGNIFICATION

(71) Applicant: HALLIBURTON ENERGY SERVICES, INC., Houston, TX (US)

(72) Inventors: Yi Pan, The Woodlands, TX (US); Jeffrey Gerard Thomas, Magnolia, TX (US); John Leslie Wisinger, Jr., Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 346 days.

(21) Appl. No.: 17/268,019

(22) PCT Filed: Dec. 13, 2018

(86) PCT No.: PCT/US2018/065368
§ 371 (c)(1),
(2) Date: Feb. 11, 2021

(87) PCT Pub. No.: WO2020/122912
PCT Pub. Date: Jun. 18, 2020

(65) Prior Publication Data
US 2021/0181043 A1    Jun. 17, 2021

(51) Int. Cl.
*E21B 47/00*    (2012.01)
*G01L 1/22*    (2006.01)
*G01B 7/16*    (2006.01)
*E21B 47/013*    (2012.01)

(52) U.S. Cl.
CPC ............... *G01B 7/16* (2013.01); *E21B 47/00* (2013.01); *E21B 47/013* (2020.05); *G01L 1/22* (2013.01)

(58) Field of Classification Search
CPC ......... E21B 47/00; E21B 47/013; G01B 7/16; G01L 1/22
See application file for complete search history.

(56) References Cited

U.S. PATENT DOCUMENTS

| | | | |
|---|---|---|---|
| 3,084,300 A * | 4/1963 | Sanchez .................... | G01L 1/18 29/446 |
| 5,014,558 A * | 5/1991 | Yano ......................... | G01L 1/22 73/804 |
| 5,763,788 A | 6/1998 | Friedhoff et al. | |
| 5,962,792 A * | 10/1999 | Kimerer, Jr. ............. | G01B 7/16 73/862.632 |

(Continued)

FOREIGN PATENT DOCUMENTS

| CN | 108627289 A | * | 10/2018 | |
|---|---|---|---|---|
| JP | 04009631 A | | 1/1992 | |
| WO | WO-2015103571 A1 | * | 7/2015 | ......... E21B 47/0006 |

OTHER PUBLICATIONS

International Search Report & Written Opinion of PCT No. PCT/US2018/065368, dated Sep. 11, 2019.

(Continued)

*Primary Examiner* — Daniel P Stephenson
(74) *Attorney, Agent, or Firm* — Polsinelli PC (57) ABSTRACT

A strain magnification apparatus can have a first section and a second section coupled with the first section. The second section can have a lower stiffness relative to the first portion and a strain gauge coupled thereto. The first section is operable to be coupled to a tool experiencing strain and the tool is formed from a material having lower elasticity than the second section.

18 Claims, 4 Drawing Sheets

(56) References Cited

U.S. PATENT DOCUMENTS

| | | |
|---|---|---|
| 7,775,099 B2 | 8/2010 | Bogath et al. |
| 8,939,039 B2 | 1/2015 | Ratcliffe et al. |
| 9,663,996 B2 | 5/2017 | Yao |
| 9,771,790 B2 | 9/2017 | Clark et al. |
| 9,869,171 B2 | 1/2018 | Chen |
| 11,512,583 B2 * | 11/2022 | Simeonov ............. E21B 47/007 |
| 2012/0132467 A1 | 5/2012 | Zeineddine |
| 2012/0312599 A1 | 12/2012 | Trinh et al. |
| 2013/0213129 A1 | 8/2013 | Kumar et al. |
| 2015/0135856 A1 * | 5/2015 | Kim .......................... G01L 1/22 |
| | | 73/862.045 |
| 2019/0242237 A1 * | 8/2019 | Yao ......................... E21B 47/01 |
| 2020/0308954 A1 * | 10/2020 | Hird ...................... E21B 47/017 |
| 2021/0181043 A1 * | 6/2021 | Pan .......................... G01B 7/16 |

OTHER PUBLICATIONS

English Abstract of JPH049631A; Retrieved from www.espacenet.com on Feb. 5, 2021.

* cited by examiner

STRAIN MAGNIFICATION

CROSS-REFERENCE TO RELATED APPLICATIONS

This application is a national stage entry of PCT/US2018/065368 filed Dec. 13, 2018, said application is expressly incorporated herein by reference in its entirety.

FIELD

The present application is directed to a strain magnification patch. More specifically, this application is directed to a strain magnification patch for use with downhole tools.

BACKGROUND

Downhole tools operable in the oil and gas industry are exposed to extreme environments including high heat and high pressures. During drilling operations, a strain measurement can be important in determining other measurements including Weight on Bit (WOB), bending, and torque. However, downhole tools designed to operate in extreme environments are robust, and thus strain measurements provided are often low resolution. Electric magnification of these strain measurements further magnifies noise within the measurement, reducing the measurements usefulness.

BRIEF DESCRIPTION OF THE DRAWINGS

Embodiments of the present application are described, by way of example only, with reference to the attached Figures, wherein.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

It should be understood at the outset that although illustrative implementations of one or more embodiments are illustrated below, the disclosed compositions and methods may be implemented using any number of techniques. The disclosure should in no way be limited to the illustrative implementations, drawings, and techniques illustrated herein, but may be modified within the scope of the appended claims along with their full scope of equivalents.

Disclosed herein is an apparatus for strain magnification of downhole tools in a wellbore environment, which can include any or all of the following features or aspects in any given example. A strain magnification device can include a patch operable to couple with a downhole tool. The patch can have a stiff section and a weak section having a strain gauge coupled thereto. The weak section can be more deformable relative to the stiff section, thus magnifying the strain experienced by the downhole tool. The weak section can be thinner and/or narrower than the stiff section, thereby providing increased deformation relative to the stiff section and accordingly magnifying the measurable strain experienced by the downhole tool.

In other instances, the weak section of the path can be formed from a different material than the stiff section. The weak section material can have a lower Young's Modulus (E) compared with a material of the stiff section. The weak section can be operable to magnify the measurable strain experienced by the downhole tool.

The present disclosure further provides a downhole tool having a strain magnification system coupled therewith. In at least one instance, the downhole tool can have a groove and/or recess formed therein operable to receive a strain magnification patch. The strain magnification patch can have a stiff section and a weak section having a strain gauge coupled thereto. The weak section can be deformable relative to the stiff section, thus magnifying the measurable strain experienced by the downhole tool.

Figure 1:
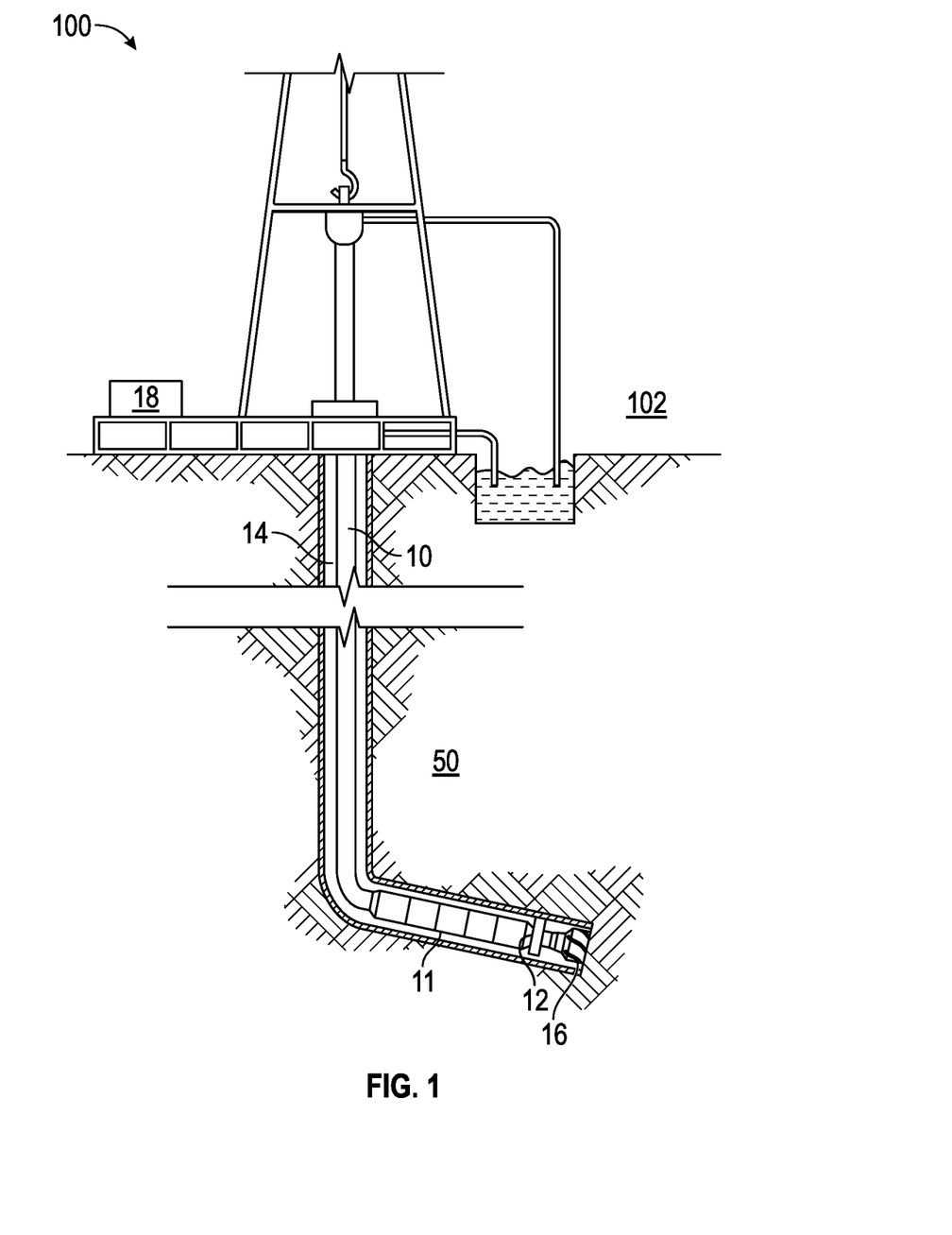
FIG. 1 is a diagrammatic view of a drilling string having a strain magnification patch disposed within a wellbore, according to the present disclosure.

FIG. 1 illustrates a drilling process according to the present disclosure. A drilling process 100 can include one or more drilling tools 11 and related equipment disposed on a surface 102 (or a boat/platform in off-shore based-operations). The one or more drilling tools 11 can be coupled with the distal end 12 of a drill string 10. A drill bit 16 can be disposed at the distal end 12 of the drill string 10 and operable to form a wellbore 14 in a subterranean formation 50. The wellbore 14 can be formed according to a desired well plan having one or more vertical, curved, and/or horizontal portions extending through one or more subterranean formations 50.

A strain magnification device 18 can be operable coupled with the drill string 10 and/or drill bit 16 (or drill shank). The strain magnification device 18 can be included in the drill bit 16 and/or independent of a drill bit. It at least one instance, the strain magnification device 18 could be coupled to an independent drill string sub that can be coupled at any joint within the drill string 10, specifically above and/or below a mud motor. The strain magnification device 18 can further be disposed directly on to a mud motor, a measurement-while-drilling (MWD) device, and/or any other bottom hole assembly (BHA) component where it is desirable to measure strain. The strain magnification device 18 can be operable to mechanically increase the measureable strain experienced by the one or more drilling tools 11 during the drilling process 100 without requiring the introduction of a weakness into the one or more drilling tools. The strain magnification device 18 can provide at least a portion being deformable relative to the remaining portion, thus providing a higher resolution strain measurement. The strain magnification device 18 can include a strain gauge coupled with the deformable portion, thus allowing a strain measurement to be taken during the drilling operation 100.

Figure 2:
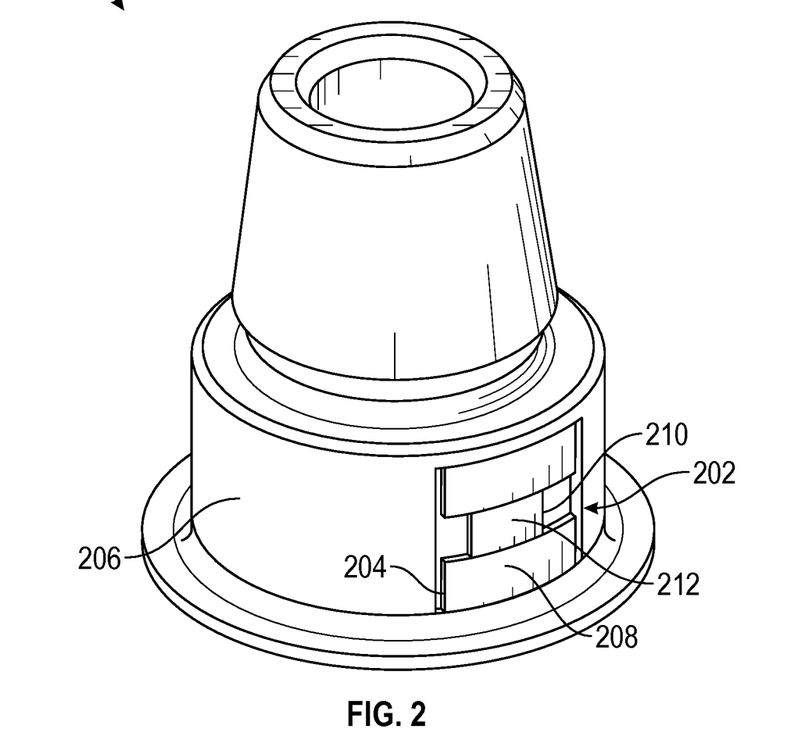
FIG. 2 is an isometric view of a drill string shank having a strain magnification patch, according to the present disclosure.

FIG. 2 illustrates a drill shank having a strain magnification patch disposed thereon. The drill shank 200 is shown coupled with a strain magnification patch 202 and is operable to magnify the strain experienced by the drill shank 200 in a downhole environment. As illustrated, the drill shank 200 has a groove 204 operable to receive the string magnification patch therein. The groove 204 can be sized and shaped to substantially correspond to the size and shape of the strain magnification patch 202, thereby allowing the drill shank 200 to have a substantially smooth exterior surface 206. In other instances, the strain magnification patch 202 can be coupled to the exterior surface 206 of drill shank 200 and thus extend above the exterior surface 206.

The strain magnification patch 202 can be coupled with the groove 204 and/or exterior surface 206 by brazing, welding, fastening, adhesive, etc. In at least one instance, the strain magnification patch 202 can be bolted to the drill shank via one or more threaded fasteners (e.g. screws and/or bolts). In other instances, the strain magnification patch 202 can be welded and/or brazed to the drill shank 200. The coupling between the strain magnification patch 202 and the drill shank 202 must be operable to withstand the temperatures and/or pressures experienced by the drill shank 200 in a downhole environment.

Figure 3:
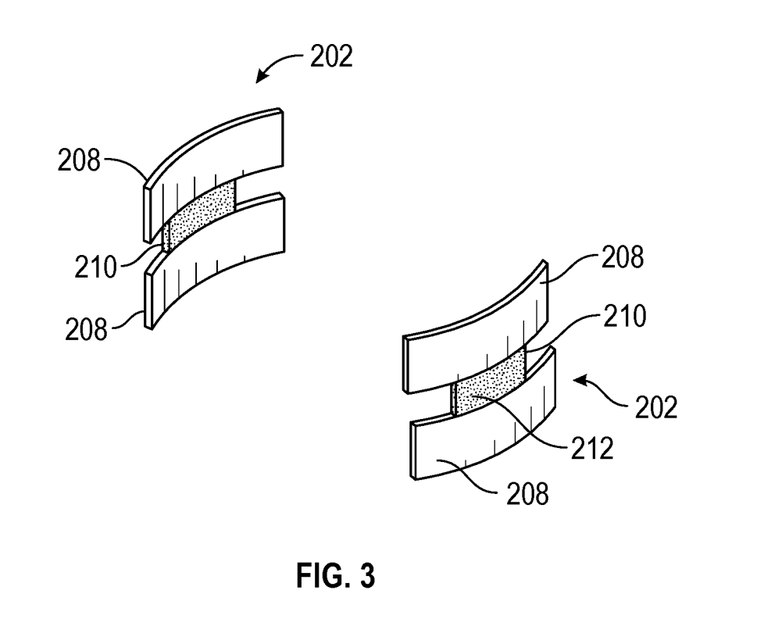
FIG. 3 is an isometric view of a strain magnification patch, according to the present disclosure.

FIG. 3 illustrates a strain magnification patch couplable with one or more downhole tools. The magnification patch 202 has a stiff section 208 and a weak section 210. The stiff section 208 can be any desirable size and shape and/or any desirable material. In at least one instance, the stiff section 208 can be made of substantially the same material as the drill shank 200. The weak section 210 can be deformable relative to the stiff section 208, thereby magnifying the strain experienced by drill shank 200.

The strain magnification patch 202 can be made of two different materials. The stiff section 208 can be formed from a first material and the weak section 210 can be formed from a second material. The second material has a higher elasticity than the first material. This elasticity may be measured using Young's modulus, such that the first material can have a higher Young's modulus (E) compared with the second material. As a result, the second material is more deformable, or more elastic, relative to the first material and provides a more measurable strain experienced by the drill shank 200. This more measurable strain may be considered a magnification of the strain as disclosed herein.

The stiff section 208 can be made from substantially the same material as the drill shank 200 (shown in FIG. 3). In at least one instance, the drill shank 200 and the stiff section 208 can be formed from materials, including, but not limited to, stainless steel, nickel, nickel alloys, Inconel, tungsten, heavy metal alloy, a steel alloy, molybdenum, ceramics (e.g. alumina, silicon carbide, zirconia), and/or intermetallics (e.g. NiAl). The weak section 210 can be formed from any material having a lower Young's modulus (E) than the stiff section 208. In at least one instance, the weak section 210 can be formed from materials including, but not limited to, Aluminum (Al), Aluminum alloys, elastomers, natural and/or synthetic rubbers, bronze, Titanium (Ti), Titanium alloys, Copper (Cu), Copper alloys, polymers, brass, and/or any other material having a Young's modulus lower than the stiff section 208.

The strain magnification patch 202 can be formed from a single material across the stiff section 208 and the weak section 210. The weak section 210 can have a reduced stiffness relative to the stiff section 208. The stiffness can be defined by the modulus and the cross-sectional area of the weak section 210. Thus, the weak section 210 can have a thinned and/or reduced shape profile relative to the stiff section 208, thereby reducing the overall stiffness of the weak section 210 relative to the stiff section 208 when formed from substantially similar and/or the same material. The thinned and/or reduced shape profile of the weak section 210 can reduce the cross-sectional area of the weak section 210 can be reduced relative to the stiff section, thereby increasing the measurable strain experienced by the drill shank 200.

The weak section 210 can incorporate a holed pattern and/or skeletal mesh to increase the measurable stain therein. The skeletal mesh pattern can contain an open network of void space (e.g. apertures) that will concentrate strain to the remaining ligaments surrounding the strain gauge. Such network can be made via additive manufacturing (3D printing) and/or a continuous material skin can be made completely around the open network to attach the stain gauge and/or the skin can be selectively placed in the location where it is desirable to attach the strain gauge. Several small holes can be drilled through the material to create several apertures therein, thus forming the weak section. The apertures will act similar to the void space in the skeletal network. Both an aperture pattern and/or skeletal mesh can be used with or without a thinned and/or reduced shape profile.

The strain magnification patch 202 can have any shape and/or arrangement operable to provide to at least one section having an increased measurable strain. The weak section having an increased measurable strain can provide significant information regarding the downhole tools and the load experienced without requiring electrical magnification that similarly magnifies the noise. The increased measurable strain provided by the weak section further allows increased resolution of the strain measurement from the drill shank 200.

The strain magnification patch can include a strain gauge 212 coupled with the weak section 210 and operable to detect strain based on the deformation (and/or change in length) of the material when under tension and/or compression. The weak section 210 can provide the drill shank 200 (and/or downhole tool) with a section and/or material operable to change length, thus providing a higher resolution strain measurement, without requiring any weakening of the drill shank 200 and/or downhole tool.

The drill shank 200 can implement one strain magnification patch 200, or multiple strain magnification patches 200. In at least one instance, the drill shank implements two strain magnification patches 200, as shown in FIG. 3.

Figure 4:
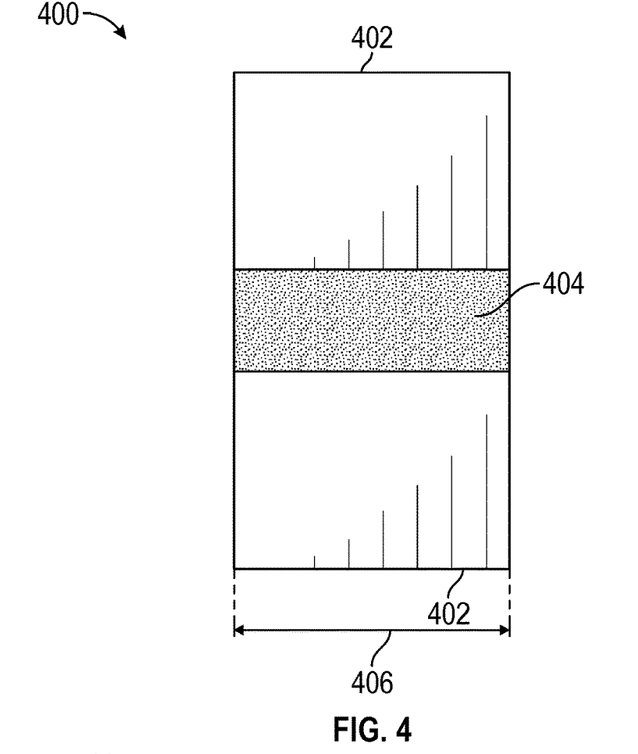
FIG. 4 is an isometric view of a strain magnification patch having a continuous width, according to the present disclosure.

FIG. 4 illustrates a strain magnification patch having a substantially uniform shape. The strain magnification patch 400 can have a substantially uniform shape across a stiff section 402 and a weak section 404. The substantially uniform shape can include a substantially uniform width 406 across the strain magnification patch 400. While the width 406 can be substantially uniform, lengths 408, 410, and/or 412 can vary between the stiff section 402 and the weak section 404. Further the thickness (or depth) of the strain magnification patch 400 may or may not be consistent between the stiff section 402 and the weak section 404.

The strain magnification patch 400 can have two stiff sections 402 disposed at opposing distal ends 414, 416. The weak section 404 can be disposed between the two stiff sections 402. The weak section 404 can be formed from a softer material (e.g. a material with a lower Young's modulus) relative to the two stiff sections 402. The two stiff sections 402 can be formed from the same material.

The weak section 404 can be sized sufficiently to be operably coupled with a strain gauge. The strain gauge can be operable to measure strain experienced by the stain magnification patch 400 and a downhole tool coupled therewith. The weak section 404 being a softer material than stiff section 402 and/or the downhole tool can provide a high resolution strain measurement to the strain gauge.

Figure 5:
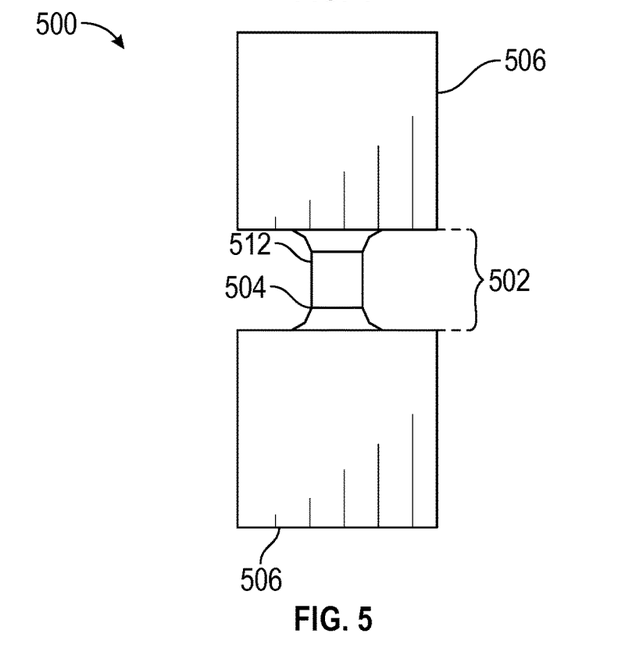
FIG. 5 is an isometric view of a strain magnification patch having a narrow middle section, according to the present disclosure.

FIG. 5 illustrates a strain magnification patch having a narrow center section. The strain magnification patch 500 can have a narrow center section 502 operable to magnify the measurable strain experienced by the strain magnification patch 500 and/or a downhole tool through a reduced stiffness. The strain magnification patch 500 can be formed from a single material that has a center section 502 having a necked section 504 of the material. The necked section 504 can magnify the measurable strain due to the cross-sectional area relative to the modulus of the material implemented within the strain magnification patch 500.

The strain magnification patch 500 can have two stiff sections 506 disposed at opposing distal ends 508, 510. A weak section 512 can be disposed between the two stiff sections 506. The weak section 512 can correspond with the necked section 504.

Figure 6:
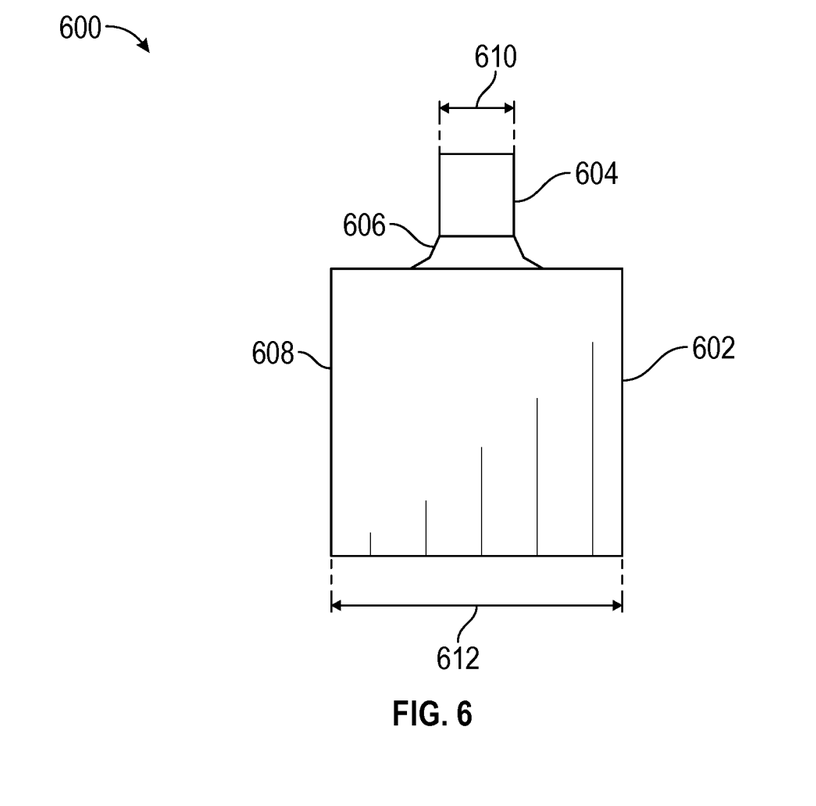
FIG. 6 is an isometric view of a strain magnification patch having narrow end section, according to the present disclosure.

FIG. 6 illustrates a strain magnification patch having a narrow end section. The strain magnification patch 600 can have a stiff section 602 and a weak section 604. The weak section 604 can be deformable relative to the stiff section 602, thereby magnifying strain experienced by the strain magnification patch 600 and/or a downhole tool. The strain magnification patch 600 can be formed from a single material that in which the weak section 602 can have a necked section 606 and/or narrowed section of the material. The necked section 602 can magnify the measurable strain due to the cross-sectional area relative to the modulus of the material implemented within the strain magnification patch 600. The stiffness of the necked section 602 can be defined by the relationship between cross-sectional area and modulus of material, thus magnifying the measurable strain.

The necked section 606 can be disposed at a distal end 608 of the strain magnification patch 600. In at least one instance, the necked section 606 can be a transition between the stiff section 602 and the weak section 604. In other instances, the necked section 606 and the weak section 604 can collectively become narrower as it approaches the distal end 608. The weak section 604 can have a width 610 approximately equal to a fraction of a width 612 of the stiff section 602, or the width 610 can be approximately equal to the width 612 of the stiff section 602.

Figure 7:
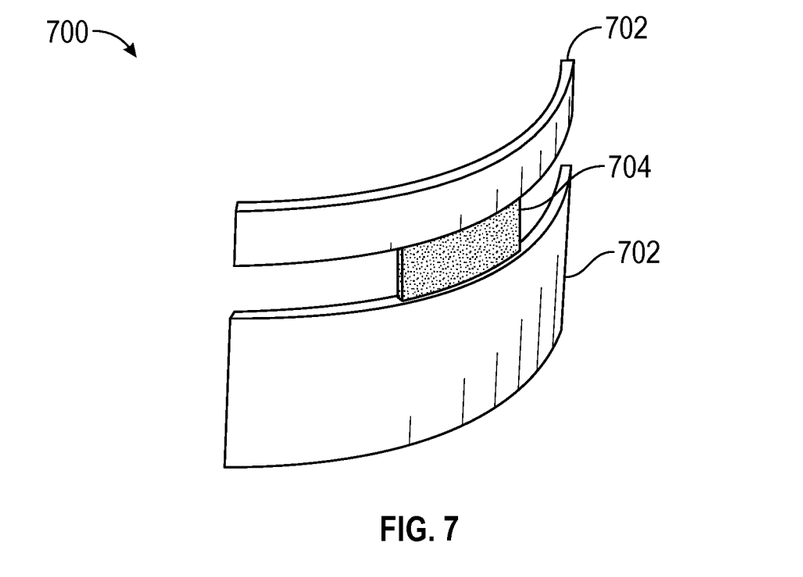
FIG. 7 is an isometric view of a strain magnification patch having narrow middle section formed from a second material, according to the present disclosure.

FIG. 7 illustrates a strain magnification patch having a narrow center section formed from a second material. The strain magnification patch 700 can have a stiff section 702 and a weak section 704. The stiff section 702 can be formed from a first material and the weak section 704 can be formed from a second material. The second material can have a lower Young's modulus compared with the first material. The weak section 704 can be a narrow center section 706 operable to magnify the measurable strain experienced by the strain magnification patch 700 and/or a downhole tool.

The strain magnification patch 700 can be formed from any two materials sufficient to provide an increase in measurable strain by the second material relative to the first material, thus providing a higher resolution strain measurement. The first material and second material on the stiff section 702 and weak section 704, respectively, can be any two materials with the second material having a lower Young's modulus than the first.

While FIGS. 3-7 detailed various arrangements of a strain magnification patch, it is within the scope of this disclosure to implement any size and/or shape strain magnification patch operable to mechanically increase the measurable strain experienced by a tool through material selection and/or size shape.

Further, while the present disclosure is generally directed to downhole tools, it is within the scope of this disclosure to implement a strain a magnification patch with any tool for which an experienced strain measurement is useful.

The embodiments shown and described above are only examples. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure to the full extent indicated by the broad general meaning of the terms used in the attached claims. It will therefore be appreciated that the embodiments described above may be modified within the scope of the appended claims.

Statement Bank:

STATEMENT 1: A downhole tool comprising a housing having a strain magnification patch coupled thereto, the strain magnification patch comprising a first section, a second section coupled with the first section, the second section having a lower stiffness relative to the first section, and a strain gauge coupled to the second section, wherein the second section has a higher elasticity than the second section, whereby strain experienced by the housing produces a magnified strain measurement as measured by the strain gauge due to the higher elasticity of the second section.

STATEMENT 2: The downhole tool of STATEMENT 1, wherein the first section and the second section are formed from the same material STATEMENT 3: The downhole tool of STATEMENT 1 or STATEMENT 2, wherein the first section and the second section are formed from different materials, the second section formed of a material having a Young's modulus (E) less than a Young's Modulus (E) of the adjacent first section.

STATEMENT 4: The downhole tool of any one of preceding STATEMENTS 1-3, wherein the first section is divided into two adjacent first sections, the second section disposed between the two adjacent first sections.

STATEMENT 5: The downhole tool of any one of preceding STATEMENTS 1-4, wherein the first section has a first width and the second section has a second width, the first width and the second width are substantially the same.

STATEMENT 6: The downhole tool of any one of preceding STATEMENTS 1-5, wherein the first section has a first width and the second section has a second width, the second width smaller than the first width.

STATEMENT 7: The downhole tool any one of preceding STATEMENTS 1-6, wherein the second section is formed at one end of the first section, the second section having a width narrower than a first section width.

STATEMENT 8: The downhole tool any one of preceding STATEMENTS 1-7, wherein the second section includes a plurality of apertures formed in a predetermined pattern and/or a skeletal mesh.

STATEMENT 9: A strain magnification system, comprising a tool string disposed within a wellbore formed in a subterranean formation, the tool string having a strain magnificent patch coupled thereto, the strain magnification patch comprising a first section, a second section, a second section coupled with the first section, the second section having a lower stiffness relative to the first section, and a strain gauge coupled to the second section, wherein the strain experienced by the tool is magnified in a strain measurement measured by the strain gauge due to the higher elasticity of the second section.

STATEMENT 10: The strain magnification system of STATEMENT 9, wherein the housing has a groove formed therein, the groove operable to receive the strain magnification patch therein.

STATEMENT 11: The strain magnification system of STATEMENT 9 or STATEMENT 10, wherein the first section and the second section are formed from the same material.

STATEMENT 12: The strain magnification system any one of preceding STATEMENTS 9-11, wherein the first section and the second section are formed from different materials.

STATEMENT 13: The strain magnification system any one of preceding STATEMENTS 9-12, wherein second section is formed of a material having a lower Young's modulus (E) than a material of the first section.

STATEMENT 14: The strain magnification system any one of preceding STATEMENTS 9-13, wherein the first section is divided into two adjacent first sections, the second section disposed between the two adjacent first sections.

STATEMENT 15: The strain magnification system any one of preceding STATEMENTS 9-14, wherein the first section has a first width and the second section has a second width, the first width and the second width are substantially the same.

STATEMENT 16: The strain magnification system any one of preceding STATEMENTS 9-15, wherein the first section has a first width and the second section has a second width, the second width smaller than the first width.

STATEMENT 17: The strain magnification system any one of preceding STATEMENTS 9-16, wherein the second section contains a plurality of apertures formed in a predetermined pattern and/or skeletal mesh.

STATEMENT 18: The strain magnification system any one of preceding STATEMENTS 9-17, wherein second section is a narrow portion formed at one end of the first section.

STATEMENT 19: The strain magnification system any one of preceding STATEMENTS 9-18, wherein at least a portion of the tool string and the first section are formed from the same material.

STATEMENT 20: A method for measuring strain in a downhole tool, the method comprising introducing a tool string into a wellbore formed in a subterranean formation, wherein the tool string includes a strain magnification patch having a first section and a second section coupled to the first section, the second section having a lower stiffness relative to the first section, and a strain gauge coupled to the second section, and measuring a strain experienced by the tool string within the wellbore, wherein the strain experienced by the tool string is concentrated in the second section, thereby producing a more measurable strain measurement.

What is claimed is:

1. A downhole tool comprising:
    a housing, the housing having a strain magnification patch coupled thereto, the strain magnification patch comprising:
        a first section;
        a second section coupled with the first section, the second section having a lower stiffness relative to the first section, wherein the first section and the second section are formed from different materials;
        a strain gauge coupled to the second section,
    wherein the second section has a higher elasticity than the first section, whereby strain experienced by the housing produces a magnified strain measurement as measured by the strain gauge due to the higher elasticity of the second section.

2. The downhole tool of claim 1, wherein the second section is formed of a material having a Young's modulus (E) less than a Young's Modulus (E) of the adjacent first section.

3. The downhole tool of claim 1, wherein the first section is divided into two adjacent first sections, the second section disposed between the two adjacent first sections.

4. The downhole tool of claim 3, wherein the first section has a first width and the second section has a second width, the first width and the second width are substantially the same.

5. The downhole tool of claim 3, wherein the first section has a first width and the second section has a second width, the second width smaller than the first width.

6. The downhole tool of claim 1, wherein the second section is formed at one end of the first section, the second section having a width narrower than a first section width.

7. The downhole tool of claim 1, wherein the second section includes a plurality of apertures formed in a predetermined pattern and/or a skeletal mesh.

8. A strain magnification system, comprising:
    a tool string disposed within a wellbore formed in a subterranean formation, the tool string having a strain magnificent patch coupled thereto, the strain magnification patch comprising:
        a first section;
        a second section, a second section coupled with the first section, the second section having a lower stiffness relative to the first section, wherein the first section has a first width and the second section has a second width, the first width and the second width are substantially the same;
        a strain gauge coupled to the second section,
    wherein the strain experienced by the tool is magnified in a strain measurement measured by the strain gauge due to the higher elasticity of the second section.

9. The strain magnification system of claim 8, wherein the housing has a groove formed therein, the groove operable to receive the strain magnification patch therein.

10. The strain magnification system of claim 8, wherein the first section and the second section are formed from the same material.

11. The strain magnification system of claim 8, wherein the first section and the second section are formed from different materials.

12. The strain magnification system of claim 8, wherein second section is formed of a material having a lower Young's modulus (E) than a material of the first section.

13. The strain magnification system of claim 8, wherein the first section is divided into two adjacent first sections, the second section disposed between the two adjacent first sections.

14. The strain magnification system of claim 8, wherein the first section has a first width and the second section has a second width, the second width smaller than the first width.

15. The strain magnification system of claim 8, wherein the second section contains a plurality of apertures formed in a predetermined pattern and/or skeletal mesh.

16. The strain magnification system of claim 8, wherein second section is a narrow portion formed at one end of the first section.

17. The strain magnification system of claim 8, wherein at least a portion of the tool string and the first section are formed from the same material.

18. A method for measuring strain in a downhole tool, the method comprising:
- introducing a tool string into a wellbore formed in a subterranean formation, wherein the tool string includes a strain magnification patch having a first section and a second section coupled to the first section, the second section having a lower stiffness relative to the first section, and a strain gauge coupled to the second section, the first section and the second section formed from different materials; and
- measuring a strain experienced by the tool string within the wellbore, wherein the strain experienced by the tool string is concentrated in the second section, thereby producing a more measurable strain measurement.

\* \* \* \* \*